United States Patent [19]

Shapiro et al.

[11] 4,377,597

[45] Mar. 22, 1983

[54] RESTRUCTURED MEAT PRODUCT FOR ROASTING AND METHOD OF PREPARING SAME

[75] Inventors: Jay H. Shapiro; Bernard J. Peck, both of Milwaukee, Wis.

[73] Assignee: Peck Meat Packing Corporation, Milwaukee, Wis.

[21] Appl. No.: 339,137

[22] Filed: Jan. 13, 1982

Related U.S. Application Data

[63] Continuation-in-part of Ser. No. 151,974, May 21, 1980, abandoned.

[51] Int. Cl.³ .............................................. A23L 1/31
[52] U.S. Cl. ..................... 426/92; 426/104; 426/272; 426/388; 426/437; 426/513; 426/641
[58] Field of Search ............... 426/92, 129, 272, 641, 426/646, 652, 410, 415, 437, 513, 388, 518, 519, 104

[56] References Cited

U.S. PATENT DOCUMENTS

| | | |
|---|---|---|
| Re. 26,182 | 4/1967 | Torr ................................ 426/388 X |
| 2,398,636 | 4/1946 | Henney et al. |
| 2,527,493 | 10/1950 | Condon ........................... 426/513 X |
| 2,673,156 | 3/1954 | Minder |
| 2,752,252 | 6/1956 | Condon |
| 3,076,713 | 2/1963 | Maas .................................. 426/272 |
| 3,542,564 | 11/1970 | Cornwell ........................... 426/272 |
| 3,903,315 | 9/1975 | Giles et al. ........................ 426/388 |
| 3,904,770 | 9/1975 | Hale et al. ...................... 426/646 X |
| 3,911,154 | 10/1975 | Weatherspoon ................ 426/513 X |
| 4,017,940 | 4/1977 | Johnson et al. ........................ 17/32 |
| 4,036,997 | 7/1977 | Verburg ............................. 426/272 |
| 4,072,763 | 2/1978 | Mart .................................. 426/513 |
| 4,210,677 | 7/1980 | Huffman ........................ 426/641 X |

Primary Examiner—Arthur L. Corbin
Attorney, Agent, or Firm—Quarles & Brady

[57] ABSTRACT

A restructured meat product for cooking comprises a mixture of lean meat chunks and elongated thin strips of lean meat which are interspersed between and intertwined about the chunks. The strips cooperate with myosin on the surface of the meat to form a product which, when cooked and sliced, resembles natural meat in taste, appearance and bite.

4 Claims, 2 Drawing Figures

U.S. Patent  Mar. 22, 1983  4,377,597
FIG. A
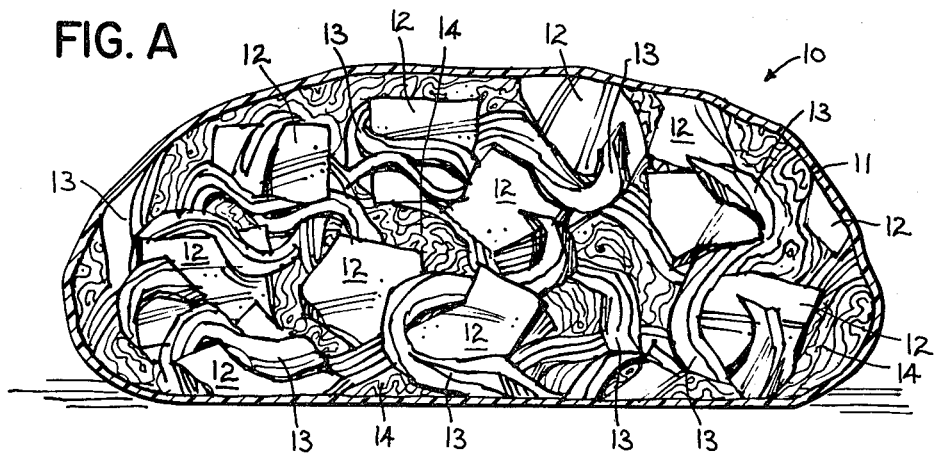
FIG. B  PRIOR ART
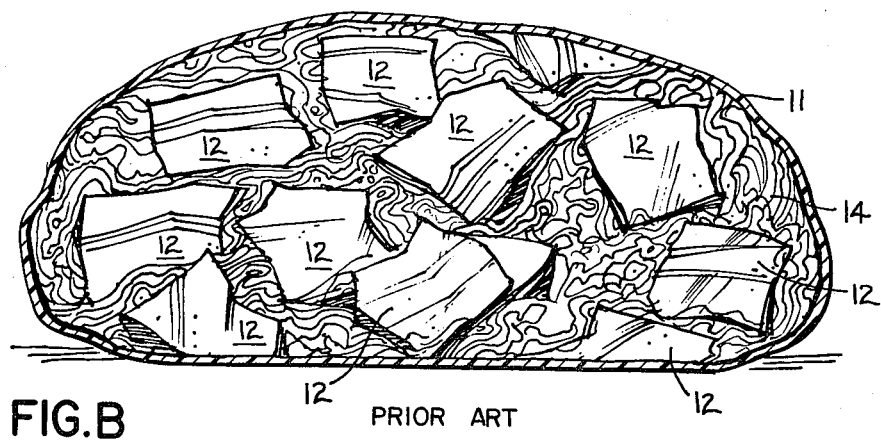

RESTRUCTURED MEAT PRODUCT FOR ROASTING AND METHOD OF PREPARING SAME

RELATED CASE

The present application is a continuation-in-part of our earlier application Ser. No. 151,974 filed May 21, 1980, now abandoned.

The present invention relates to a meat product, and more particularly to a restructured meat product to be cooked and a method of making that product.

BACKGROUND OF THE INVENTION

When the concept of selling thin sliced roast beef sandwiches in fast-food restaurants was first conceived and initiated, a solid muscle derived from the inside round of beef was roasted to provide the sliced roast beef. This muscle was referred to as "the heart" of the inside round. When there was only a limited number of outlets selling the product, supply was no problem. However, as the number of outlets increased they began to compete with each other for supplies and soon the lack of availability of "the heart" of the round became a serious problem.

In the 1960's the first sectioned and formed roast beef product for fast-food restaurant use was developed. The product was a mixture of lean beef chunks with a chopped beef binder and it was stuffed into a number 9 cellulose casing. It had the appearance of a large bologna or salami. The primary problem with the new product was that it had limited customer appeal as the consumer thought of the product as nothing more than a processed luncheon meat item and not a true roast beef product. In addition, the product was difficult to work with. During the cooking process, sometimes the product would actually explode in the oven. However, it did have the advantages of reasonable cost and availability and it did relieve the fast-food restaurants from their dependency on the solid muscle product.

In the early 1970's a restructured product comprised of a mixture of about 80% lean beef chunks and a ground beef binder was introduced. It had a more natural shape which resembled the old heart of the inside of the round. However, the product still had a number of definite drawbacks as the final roasted and sliced product did not have the appearance, bite or consistency of natural roast beef. Therefore, the product met with customer resistance and it was not considered, even when roasted in the restaurant, to be a true "roast beef". In addition, because of lack of quality control and product specifications, and the bastardization of the restructured product by a number of producers the quality and consistency of the product suffered.

In Huffman U.S. Pat. No. 4,210,677 a method is disclosed for preparing a restructured meat product from mechanically tenderized chunks and thinly sliced meat. An essential step of the Huffman patented process is the mechanical tenderization, preferably four times, of the meat chunks.

SUMMARY OF THE INVENTION

It is an object of the present invention to disclose a novel restructured meat product for cooking.

It is another object to disclose a novel restructured beef product which, when roasted and sliced, closely resembles, in appearance, taste and bite, the product obtained when a natural solid muscle is roasted and sliced.

It is a further object to disclose a method of preparing a novel restructured meat product from chunks of meat without first mechanically tenderizing such chunks.

The restructured meat product of the present invention comprises a mixture of chunks of lean meat and elongated thin strips of lean meat which have been treated with a salt solution to extract myosin and bring it to the surface of the meat. The mixture is held together by the strips being interspersed between and intertwined about the chunks and by the adhesiveness of the myosin. A binder of chopped meat and fat may be present. The mixture is shaped into a desired form and may be packaged in a plastic bag.

The restructured meat product of the present invention is preferably prepared by forming a mixture of the untenderized lean meat chunks and the elongated thin lean meat strips and treating the mixture with an aqueous solution of salt and food grade phosphates to extract the myosin from the striated muscle. Upon extraction, the myosin rises to the outer surfaces of the chunks and strips. If desired, a binder of chopped meat and fat is then added with mixing and the mixture is stuffed under vacuum into a plastic bag to form a product having the desired shape. During the mixing and stuffing the elongated strips become interspersed between and intertwined about the chunks to physically bind the chunks and strips into a unitary mass. Thus the strips cooperate with the myosin, the binder and the bag to eliminate voids and to hold the chunks of meat tightly together.

The restructured product obtained when beef is used as the meat has a natural appearance and texture when roasted and sliced, and does not have the rubberiness of bite that characterizes prior art restructured beef products.

These and other advantages and objects of the present invention will be apparent to those skilled in the art from the description and drawing which follows.

BRIEF DESCRIPTION OF THE DRAWING

In the drawing:

FIG. A is a cross-sectional view showing the composition of the restructured meat product of the present invention prior to roasting; and FIG. B is a similar cross-sectional view showing the composition of a prior art restructured meat product prior to roasting.

DESCRIPTION OF THE PREFERRED EMBODIMENT OF THE INVENTION

A preferred restructured beef product of the present invention comprises:

(a) about 60% of lean beef chunks, roughly in the shape of 1 inch cubes and about 2 ounces to about 3 ounces in weight;

(b) about 20% of thin elongated beef strips which are about 3 to about 4 inches long, about ⅜ inch wide and about ¼ inch thick;

(c) about 16% of a binder of chopped beef containing up to 50% fat; and (d) about 4% of an aqueous salt solution of 1% sodium chloride and 0.5% of food grade phosphates.

The product is held together by the thin strips which are interspersed between and intertwined about the chunks and by myosin, an adhesive protein on the surface of the strips and chunks. The product is preferably packaged in a virgin polyethylene plastic bag for ease of storage and handling.

Referring now to FIG. A of the drawing, it can be seen that the preferred restructured beef product of the present invention, which is generally referred to by the numeral 10, is in a plastic bag 11 and includes a plurality of irregular shaped chunks of lean beef 12 having interspersed between and intertwined about them a plurality of thin elongated strips of lean beef 13. The remainder of the internal volume or space of the bag 11 is substantially filled with a mixture 14 of a chopped beef and fat binder.

Referring now to FIG. B, it can be seen that the prior art restructured beef product is similar in composition except that it does not include the elongated strips 13.

The use of the elongated strips helps bind the product together securely. This is probably due to the fact that the thin strips provide a larger outer surface area for the extraction and the accumulation of myosin. Myosin, which is a globulin obtained from striated muscle, helps adhere the strips, chunks and the binder together to form a product more closely resembling a solid muscle.

The elongated strips in the formulation of the restructured product of the present invention also increase the useful yield of the cooked end product by eliminating the voids and spaces which sometimes occur in the prior art product. During the cooking of the prior art product juices collect in such spaces and are not absorbed back into the product thereby adversely effecting yield, as well as the texture and the flavor.

The restructured product may contain from about 60% to about 80% of the lean meat chunks and about 40% to about 20% of the elongated meat strips. The chunks and strips may be fresh, raw, unaged meat and need not be mechanically tenderized. This is a significant advantage over the patented Huffman process because mechanical tenderization is a time-consuming and expensive procedure requiring special equipment not possessed by many meat packers. A product particularly useful for institutional use contains no binder.

The preferred binder, which contains about 50% chopped meat and 50% fat, can be added in amounts up to about 25% of the lean meat. It is added to the lean meat chunks and strips to help bind the solid pieces together and to make the product self-basting and juicer.

The aqueous salt solution which is present as 1% to 7% of the restructured product preferably contains 1% sodium chloride and 0.5% food grade phosphates. However, it may contain from 0.5 to 1.5% of NaCl and lesser concentrations of the food grade phosphates if desired. The use of strips which have a larger outer surface area than the chunks alone makes it possible to use lower levels of the food grade phosphates for myosin extraction than required for the preparation of the restructured beef products of the prior art which contained only chunks.

The restructured meat product is usually packaged in a plastic bag, preferably a virgin polyethylene bag of 2.5 mil. However, other packaging materials including cellulose casings can be used. If the product is to be cooked in the bag it is packaged in a relatively high density polyethylene bag which can withstand the temperatures and pressures encountered in cooking.

In the preferred method of the present invention, the untenderized lean meat chunks and the elongated untenderized meat strips are first extracted with the aqueous solution of salt and phosphate to bring the myosin to the outer surfaces of the solid pieces of meat. If the binder of chopped meat containing fat is used it is then added to the chunks and strips and the mass is massaged under vacuum for another 5 minutes to extract additional myosin. The resulting mixture is then stuffed under vacuum into a plastic bag, preferably using a conventional stuffing machine to obtain a natural roast shaped unit preferably weighing about 10 pounds.

It appears that the mixing and stuffing operations both assist in interpersing and intertwining the strips about the chunks and uniformly distributing the binder.

The restructured meat products of the present invention can be frozen and supplied, either precooked or uncooked. The precooked product is packaged in a suitable plastic roasting bag, preferably high density polythylene, and cooked until the desired internal temperature is reached. It is then supplied to the user in the same bag. The uncooked product is normally first removed from the plastic bag, thawed, cooked and then sliced to yield the desired product.

The practice of the method of the present invention will be further illustrated by the example which follows.

EXAMPLE

Sixty pounds of irregular chunks of lean beef, roughly in the shape of 1 inch cubes and about 2 to 3 ounces in weight, and twenty pounds of elongated strips of lean beef, of about 3 to about 4 inches long and about ⅜ inch wide and about ¼ inch thick, were mixed together and treated with about 4 pints of an aqueous solution containing 1% sodium chloride and 0.5% sodium tripolyphosphate to extract the myosin. The mixture was massaged under vacuum for 10 minutes. Sixteen pounds of a binder of chopped beef containing 50% fat was then added to the mixture of chunks and strips. The resulting mass was mixed for another 5 minutes to obtain additional myosin extraction and then stuffed under vacuum into 2.5 mil virgin polyethylene plastic bags, each containing 10 pounds of the mixture. The bags were then sealed and frozen.

A frozen 10 pound restructured beef unit prepared as described was removed from the bag, unthawed and then roasted until it reached an internal temperature of 140 to 160 degrees F. It was removed from the oven and thinly sliced. The resulting sliced product was submitted to a taste panel which ruled that it had a superior flavor, taste and bite as compared to a prior art restructured beef product which did not contain the elongated strips.

It will be readily apparent to those skilled in the art that the foregoing example has been for purposes of illustration only and that a number of modifications can be made without departing from the spirit and scope of the present invention. For example, as previously indicated a 100% lean meat restructured product can be prepared using only the chunks of meat and the elongated strips of meat with no binder. The thus obtained product is not self-basting but it even more closely resembles natural cooked meat. It is preferably supplied precooked to the user.

Although in the foregoing example the restructured product described was a beef product, it will be appreciated that other sources of the lean meat or binder can be used, including poultry, pork, veal and the like.

In view of the modifications and changes that can be made, it is to be understood that the invention is not to be limited by the description but only by the claims which follow.

We claim:

1. A method of preparing a restructured meat product from meat which has not been mechanically tenderized, which product, when roasted and sliced, has the flavor, appearance and texture of a natural roast, said method consisting essentially of:
   (a) treating untenderized lean meat pieces, comprising at least 20% and up to about 40% elongated thin strips and about 60% to about 80% lean meat chunks, with an aqueous solution of salt and phosphate to extract myosin from the striated muscle in the meat and to cause the myosin to rise to the outer surfaces of the strips and chunks;
   (b) interspersing the strips between and intertwining the strips about the chunks; and then
   (c) forming the resulting strip-chunk mixture into a restructured meat product of a desired shape for roasting, said product being held in the desired shape by the physical tying action of the elongated strips, which are interspersed between and intertwined about the chunks of meat, and the adhesive nature of the myosin.

2. The method of claim 1 in which the meat is beef.

3. The method of claim 1 in which a binder is added to the strip-chunk mixture prior to forming the mixture into the product of desired shape.

4. A restructured meat product made by the method of claim 1.

* * * * *